(12) United States Patent
Geraud-Grosheny et al.

(10) Patent No.: US 12,343,927 B2
(45) Date of Patent: Jul. 1, 2025

(54) METHOD FOR ATTACHING A PART TO A CARRIER BY TRANSFER OF AN ADHESIVE FILM

(71) Applicant: SAFRAN, Paris (FR)

(72) Inventors: Pierre François Robin Geraud-Grosheny, Moissy-Cramayel (FR); Romain Picon, Moissy-Cramayel (FR); Justine Delozanne, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/873,003

(22) PCT Filed: Jun. 8, 2023

(86) PCT No.: PCT/FR2023/050815
§ 371 (c)(1),
(2) Date: Dec. 9, 2024

(87) PCT Pub. No.: WO2023/237840
PCT Pub. Date: Dec. 14, 2023

(65) Prior Publication Data
US 2025/0170771 A1 May 29, 2025

(30) Foreign Application Priority Data

Jun. 9, 2022 (FR) ........................ 2205539

(51) Int. Cl.
*B29C 63/16* (2006.01)
*B29C 65/00* (2006.01)
(Continued)

(52) U.S. Cl.
CPC .......... *B29C 63/16* (2013.01); *B29C 65/5057* (2013.01); *B29C 66/742* (2013.01);
(Continued)

(58) Field of Classification Search
CPC ..... B29C 63/16; B29C 65/50; B29C 65/5057; B29C 65/5092; B29C 65/48;
(Continued)

(56) References Cited

U.S. PATENT DOCUMENTS

| 2012/0301292 | A1* | 11/2012 | Deal | F01D 5/147 |
| | | | | 416/224 |
| 2013/0220537 | A1* | 8/2013 | Parkin | F01D 5/14 |
| | | | | 156/60 |

(Continued)

FOREIGN PATENT DOCUMENTS

| FR | 2 992 887 A1 | 1/2014 |
| FR | 3 043 686 A1 | 5/2017 |

OTHER PUBLICATIONS

International Search Report as issued in International Patent Application No. PCT/FR2023/050815, dated Sep. 8, 2023.
(Continued)

*Primary Examiner* — Philip C Tucker
*Assistant Examiner* — Brian R Slawski
(74) *Attorney, Agent, or Firm* — Pillsbury Winthrop Shaw Pittman LLP

(57) ABSTRACT

A method for transferring an adhesive onto a part intended to be glued on a carrier, the adhesive being in the form of a double-sided film including a separator on each face, the part including an internal concave portion that does not enable uniform application of the adhesive film once the separators have been removed. The method includes attaching the adhesive film to a punch that matches the shape of the part within a range that approximately corresponds to the thickness of the adhesive film; removing the separator from the side of the adhesive film that is to be attached to the part; setting the part on the punch covered with the adhesive film that has had its separator removed; and transferring the
(Continued)

adhesive film onto the part by creating a vacuum between the part and the punch by means of a vacuum device.

11 Claims, 5 Drawing Sheets

(51) Int. Cl.
    *B29C 65/50*       (2006.01)
    *B29L 31/08*       (2006.01)
    *F01D 5/28*        (2006.01)

(52) U.S. Cl.
    CPC ......... *B29L 2031/082* (2013.01); *F01D 5/288* (2013.01); *F05D 2230/23* (2013.01); *F05D 2240/303* (2013.01)

(58) Field of Classification Search
    CPC ... B29C 65/483; B29C 65/486; B29C 65/526; B29C 66/301; B29C 66/742; B29L 2031/082; F01D 5/288; F05D 2230/23; F05D 2240/303
    USPC ... 156/60, 87, 230, 239, 247, 249, 285, 286, 156/289, 293, 701, 706, 707; 416/224, 416/229 R, 229 A, 241 R; 29/889.7, 29/889.71
    See application file for complete search history.

(56) References Cited

U.S. PATENT DOCUMENTS

| | | | |
|---|---|---|---|
| 2015/0151485 A1* | 6/2015 | Godon | B29C 66/8221 264/261 |
| 2016/0010468 A1* | 1/2016 | Kray | F01D 5/28 416/224 |
| 2016/0076387 A1* | 3/2016 | Chauvin | F01D 25/285 156/423 |
| 2018/0009156 A1* | 1/2018 | Hiemeyer | B29C 65/48 |
| 2018/0230825 A1* | 8/2018 | Gimat | F04D 29/324 |
| 2021/0010377 A1* | 1/2021 | Blanquart | B29C 65/5057 |

OTHER PUBLICATIONS

Written Opinion of the International Searching Authority as issued in International Patent Application No. PCT/FR2023/050815, dated Sep. 8, 2023.

* cited by examiner

[Fig. 1]
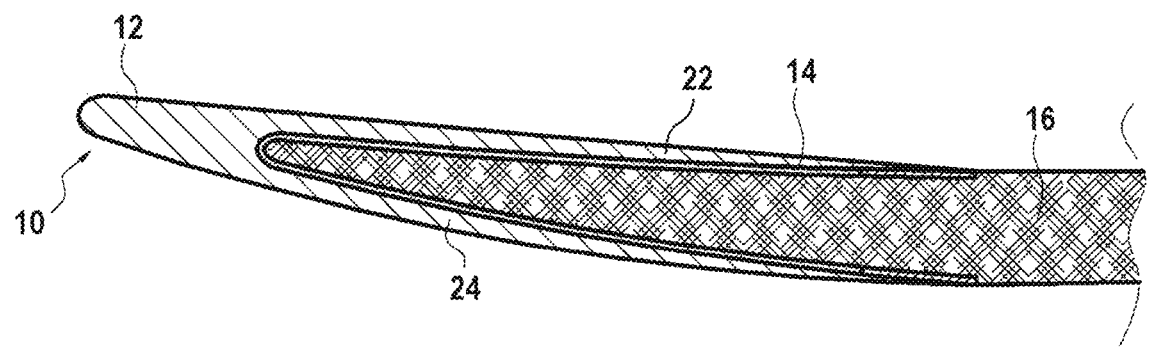
[Fig. 2]
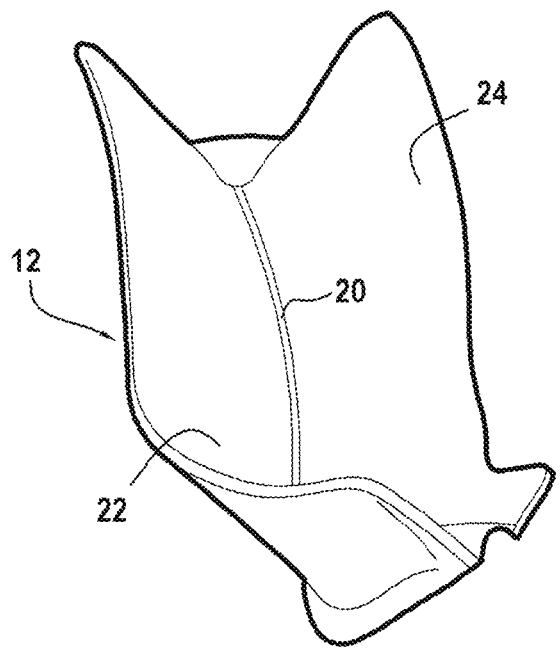

[Fig. 3]
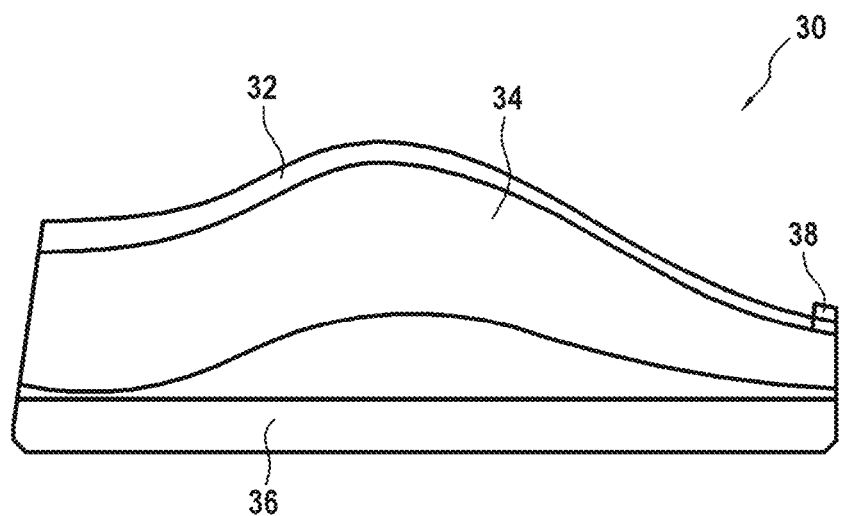
[Fig. 4]
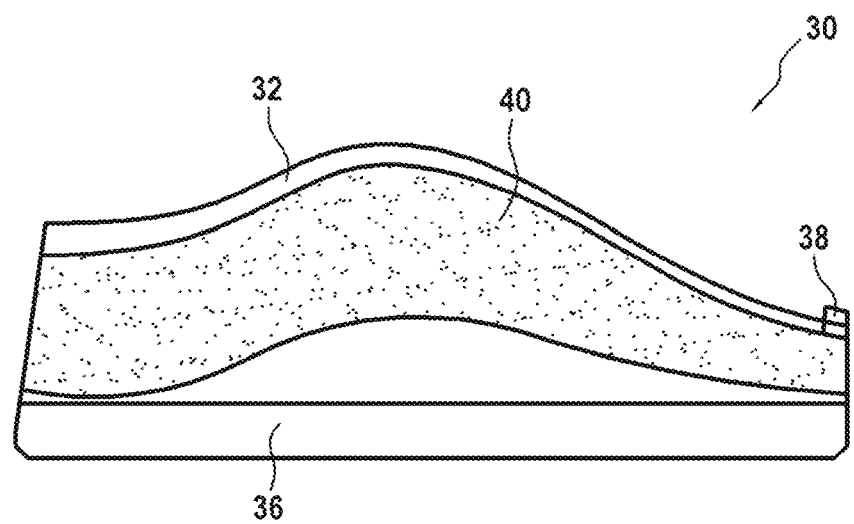

[Fig. 5]
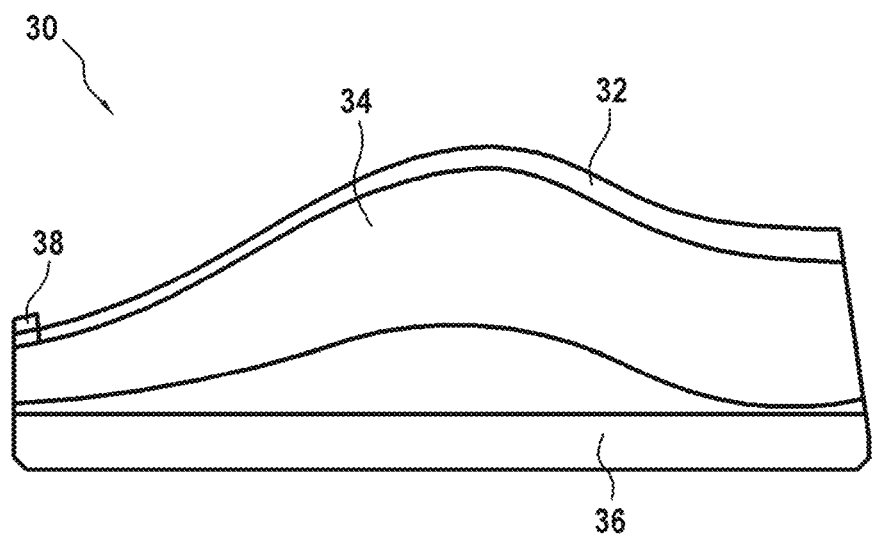
[Fig. 6]
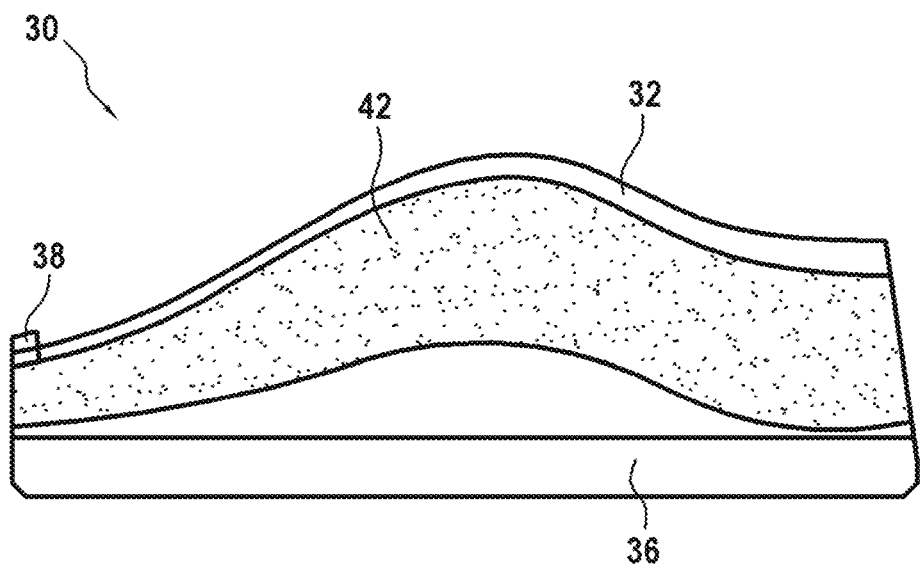

[Fig. 7]
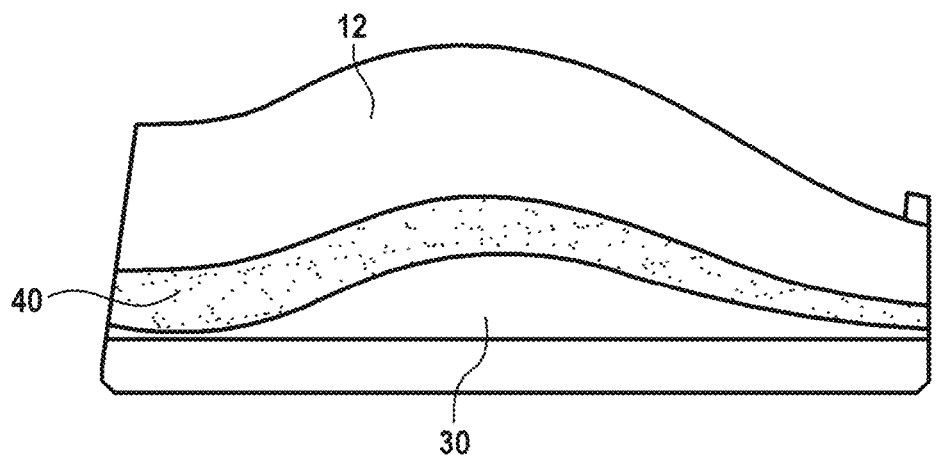
[Fig. 8]
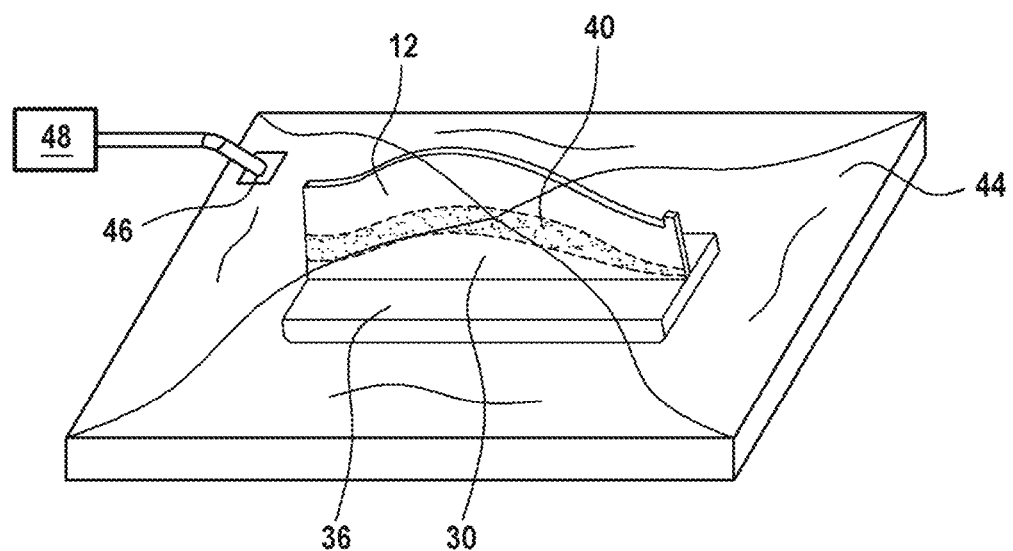

[Fig. 9]
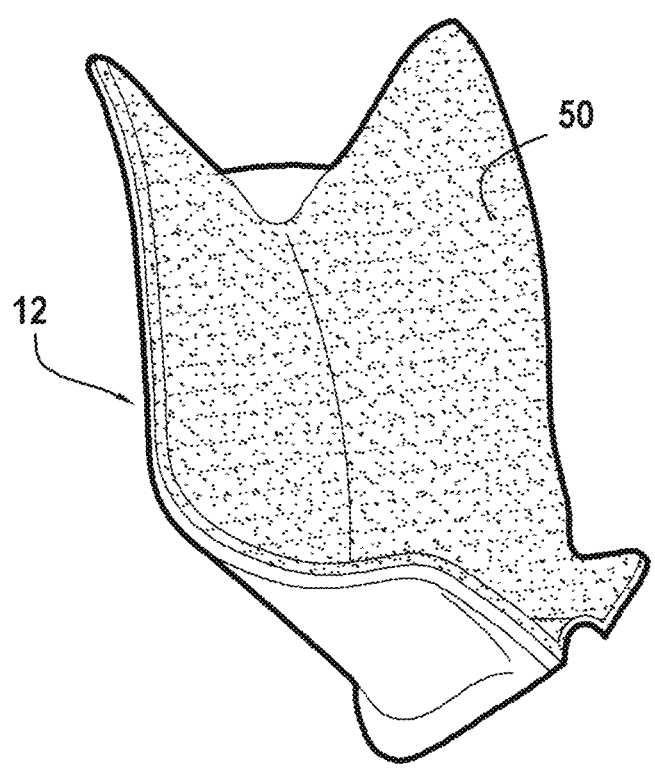

METHOD FOR ATTACHING A PART TO A CARRIER BY TRANSFER OF AN ADHESIVE FILM

CROSS-REFERENCE TO RELATED APPLICATIONS

This application is the U.S. National Stage of PCT/FR2023/050815, filed Jun. 8, 2023, which in turn claims priority to French patent application number 2205539 filed Jun. 9, 2022. The content of these applications are incorporated herein by reference in their entireties.

TECHNICAL FIELD

The present invention relates to the field of adhesive glueing of one metal or composite part to another metal or composite part, the geometry of which includes a concave portion unsuitable for receiving the adhesive, and it also relates more particularly to the adhesive attachment of a metallic structural reinforcement on the leading edge of a turbomachine fan blade.

PRIOR ART

To date, no method is known enabling repeated insertion of an adhesive into a cavity, or more generally into a concave portion to which access is restricted, so there is currently no guarantee of the total presence of the adhesive over the entire surface to be glued. This problem is particularly acute in the context of co-injection of a turbomachine composite fan blade and its metallic leading edge, in which it is necessary to enable simultaneous assembly of the 3D woven carbon preform, the adhesive and the metallic leading edge, whereas to date the adhesive is deposited on the leading edge which is then assembled with the preform provided with this adhesive.

DISCLOSURE OF THE INVENTION

The main aim of the present invention is therefore to overcome the current shortcoming with a repeatable and reliable method ensuring an unparalleled guarantee of the positioning of the adhesive, even in the most difficult to access portions.

These aims are achieved by a method for transferring an adhesive onto a part intended to be glued to a carrier, the adhesive being in the form of a double-sided film comprising a separator on each face, the part comprising at least one internal concave portion that does not enable uniform application of the adhesive film once the separator has been removed, characterised in that, in order to enable uniform application of the adhesive film to the part, and particularly to the internal concave portion, the method comprises the following steps:
  attaching the adhesive film to a punch that matches the shape of the part within a range that approximately corresponds to the thickness of the adhesive film,
  removing the separator from the face of the adhesive film that is to be attached to the part,
  setting the part on the punch covered with the adhesive film that has had the separator removed, and
  transferring the adhesive film onto the part by creating a vacuum between the part and the punch by means of a vacuum device.

Thus, by inserting the adhesive film under vacuum by means of a punch taking the internal shape of the part to be glued, it is possible to ensure a perfect glueing without creating air pockets.

Preferably, the adhesive film does not entirely cover an upper portion of the punch.

According to the intended embodiment, the adhesive film can be attached to the punch by glueing a plurality of double-sided tapes disposed between a first separator of the adhesive film and the punch, or the adhesive film can be attached to the punch by direct glueing after removing a first separator of the adhesive film, or else the adhesive film can be attached to the punch by suction due to the vacuum created through orifices of the punch by the vacuum device. Finally, the adhesive film provided with a plasticised separator can be attached to the punch by electrostatic adherence, the punch being electrically charged beforehand.

According to the intended embodiment, the transfer of the adhesive film onto the part is carried out by the vacuum device acting on a vacuum bag, in which the punch covered with the adhesive film has been placed, or the transfer of the adhesive film onto the part is carried out by the vacuum device acting on an airtight membrane matching the shape of the punch, the punch being provided with orifices for the passage of the vacuum.

Advantageously, the orifices of the punch are produced according to a grid, the holes of which are sized in order to prevent the passage of the adhesive film.

Preferably, the positioning of the set part is ensured by a mechanical stop present at one end of the punch.

BRIEF DESCRIPTION OF FIGURES

Other features and advantages of the present invention will become apparent from the description given below, with reference to the appended drawings which illustrate an exemplary embodiment that is in no way limiting and wherein:

FIG. 1 illustrates a partial section of a metallic structural reinforcement glued on a leading edge of a composite material blade, FIG. 2 is a perspective view of the metallic structural reinforcement before transfer of the adhesive, FIG. 3 is an elevation view of a face of a punch enabling the application of a first adhesive film, FIG. 4 is a view of FIG. 3 with the first adhesive film in place, FIG. 5 is an elevation view of an opposite face of the punch enabling the application of a second adhesive film, FIG. 6 is a view of FIG. 5 with the second adhesive film in place, FIG. 7 shows the positioning of the metallic structural reinforcement on the punch bearing the first and second adhesive films, FIG. 8 shows the application of a vacuum bag around the punch-adhesive films-metallic structural reinforcement assembly, and FIG. 9 is a perspective view of the metallic structural reinforcement removed from the vacuum bag and before its glueing on the leading edge of the blade.

DESCRIPTION OF THE EMBODIMENTS

The principle of the invention resides in the use of a punch, for example made of aluminium, the geometry of which corresponds to the internal surface of the part to be glued with an offset equivalent to the thickness of the adhesive before being applied on the punch, and of a means for generating an adherence of this adhesive to the punch in order to then transfer this adhesive, using a vacuum device, onto the part to be glued.

FIG. 1 is a partial section of a turbomachine fan blade 10 comprising a metallic structural reinforcement 12, typically made of titanium, glued by means of an adhesive 14 on the leading edge 16 made of composite material of this fan blade.

Conventionally, and as shown in FIG. 2, the metallic structural reinforcement 12 is a one-piece part comprising a substantially V-shaped section with a base 20 with rounded internal profile intended to match the leading edge, prolonged by two lateral edges 22, 24 which become thinner as they move away from the base and intended in turn to match the intrados and extrados edges of the blade. The internal radius of curvature of the base 20 being particularly low as well as the angle between the lateral edges of the V, it is not easy to access the internal surface of the metallic structural reinforcement and thus to apply the adhesive correctly and repeatedly and over the entire surface of the leading edge.

According to the invention, the method for attaching the adhesive, the various steps of which are illustrated with reference to FIGS. 3 to 9, can solve this problem. The adhesive is conventionally formed of an adhesive film (typically an epoxy paste glue) sandwiched between two plastic (typically plasticised) separators or even paper separators (then typically of the Teflon-coated type).

FIG. 3 illustrates a face 34 of the punch 30 used for the deposit of a first adhesive film before its transfer onto the part (in this case a titanium structural reinforcement) before then being glued to its carrier (in this case a leading edge of a 3D woven carbon turbomachine fan blade).

FIG. 4 illustrates this same face once the first adhesive film 40 is attached on the first face of the punch. It should be noted that the adhesive film cannot entirely cover the upper portion 32 intended to receive the base 20 of the metallic structural reinforcement. In order to enable the attaching of the adhesive film on the punch, it is necessary to make it adhere to this punch such that it is possible to maintain this adhesive film in position. This adherence can be produced in various ways. A first way to do this consists of removing the separator corresponding to the face that is to be attached to the punch, and attaching the adhesive film, with its separator thus removed, to the punch. The second way which makes it possible to avoid any contamination of the adhesive film with the preceding glueing consists of using pieces of two-sided adhesive tape glued, on the one hand, to the face of the punch and, on the other hand, to the separator of the adhesive film.

FIGS. 5 and 6 illustrate this same operation of applying a second adhesive film 42 to the other face of the punch. At the end of this operation, two adhesive films are therefore deposited, one on the so-called intrados surface of the punch and the other on the so-called extrados surface of the punch (the upper portion 32 being left at least partially free of adhesive film, as previously indicated, as well as the base 36 of the punch). Once these two depositing operations have been performed, the outer separator corresponding to the side that is to be attached to the part to be glued is removed from the first and second adhesive films.

FIG. 7 shows the following step of the method consisting of setting the part to be glued (in this case the metallic structural reinforcement 12) on the punch 30 provided with these two adhesive films 40, 42 with their external separators removed. The positioning of the part to be glued is ensured by a mechanical stop 38 present at the end of the punch 30 and on which the part to be glued comes to rest. The presence of a surplus of adhesive film 40 should be noted, along the entire length of the part to be glued 12, in order to prevent the glue from sliding towards the inside of the part. More specifically, in the case of a carbon preform, the exits from the layers due to the decrease in its thickness, generate attachment points which could cause the adhesive film to roll towards the inside of the metallic structural reinforcement leaving a portion of the surface of the lateral edges free from said adhesive film and therefore not glued.

FIG. 8 shows how the transfer of the adhesive films onto the part to be glued 12 is achieved. To do this and in order to ensure a good quality transfer, the punch-adhesive films-part assembly to be glued is inserted in a vacuum bag 44, the surplus of adhesive films exposed by the removal of the external separators being protected by a non-perforated protective tape. The vacuum is then drawn in the vacuum bag through its inlet valve 46 from a vacuum device 48 in order to apply a uniform pressure on the part to be glued 12 and to transfer the adhesive onto the internal surface of this part. Once the vacuum is obtained in the bag (it is carefully checked that there is no further movement of the bag or leak), it is then maintained for a minimum time of 10 seconds and without a maximum time limit. In order to prevent the vacuum bag 44 from being pierced on contact with the sharp edges of the punch or of the part to be glued, it may be useful to cover the assembly with a draining membrane (felt, for example) in order to thus apply a more uniform pressure to the entire assembly.

FIG. 9 shows the end part obtained after removing the punch 30 once the vacuum bag is opened, the internal surface 50 of which is fully covered with its adhesive film transferred from the punch.

It should be noted that other embodiments than those previously described are possible for the operations of holding the adhesive films on the punch and of transferring these films from the punch to the part to be glued.

A preferred variant consists, in particular, of holding the adhesive films electrostatically by electrically charging the punch beforehand then directly applying the adhesive film to it, protected by a plastic separator. In an alternative embodiment, the punch can be designed with holes on its surface, through which it is then possible to draw the vacuum in order to place the adhesive films on the punch by suction, which remain stuck there by the simple effect of the vacuum. The holes are advantageously in the form of a grid of holes, the dimensions of which are sufficiently low to prevent any passage of the film through them. In this way, the preliminary step of attaching the adhesive films with pieces of double-sided adhesive tape can be omitted, further minimising the dispersion due to the depositing of these pieces of adhesive tape and ensuring a time saving for the overall method.

Similarly, the transfer of adhesive films carried out using a vacuum bag, can also be performed with the help of an airtight membrane in the shape of the punch, enabling compaction and application of pressure on the leading edge, necessary for the transfer of the glue from the punch to the leading edge. In this way, the operator only has to thread the membrane onto the punch, the shape of which it matches, the punch once again having to be provided with holes for drawing the vacuum through its surface.

In the intended application, the invention thus has the following advantages:
reliability of the insertion operation of the glue in the leading edge, possibility of inserting the glue-leading edge assembly on the preform, ensuring the positioning of the glue over the entire surface of the fins of the leading edge, preventing a subsequent infiltration of resin between the glue and the leading edge.

Finally, it should be noted that although the invention has been essentially described in the context of glueing a metallic structural reinforcement on a leading edge of a composite material blade, it is of course also applicable to all industrial fields that require the glueing of complex parts, whatever the material.

The invention claimed is:

1. A method for transferring an adhesive onto a part intended to be glued to a carrier, the adhesive being in the form of a double-sided film comprising a separator on each side, the part comprising at least one internal concave portion that does not enable uniform application of the adhesive film once the separators have been removed, wherein, in order to enable uniform application of the adhesive film to the part the method comprises:

attaching the adhesive film to a punch that matches the shape of the part within a range that approximately corresponds to the thickness of the adhesive film, removing the separator from a side of the adhesive film that is to be attached to the part, setting the part on the punch covered with the adhesive film that has had its separator removed, and transferring the adhesive film onto the part by creating a vacuum between the part and the punch.

2. The method according to claim 1, wherein the adhesive film does not entirely cover an upper portion of the punch.

3. The method according to claim 1, wherein the adhesive film is attached to the punch by glueing a plurality of double-sided tapes disposed between a separator of the adhesive film and the punch.

4. The method according to claim 1, wherein the adhesive film is attached to the punch by glueing directly after removing a separator from the adhesive film.

5. The method according to claim 1, wherein the adhesive film is provided with a plasticised separator and is attached to the punch by electrostatic adherence, the punch being electrically charged beforehand.

6. The method according to claim 1, wherein the adhesive film is attached to the punch by suction due to the vacuum created through holes of the punch.

7. The method according to claim 1, wherein the transferring of the adhesive film onto the part is carried out by the vacuum acting on an airtight membrane matching the shape of the punch, the punch being provided with orifices for passage of the vacuum.

8. The method according to claim 6, wherein the holes of the punch are produced according to a grid, the holes of which are sized in order to prevent passage of the adhesive film.

9. The method according to claim 1, wherein the transferring of the adhesive film onto the part is carried out by the vacuum acting on a vacuum bag in which the punch covered with the adhesive film has been placed.

10. The method according to claim 1, wherein positioning of the set part is ensured by a mechanical stop present at one end of the punch.

11. A process comprising applying the method according to claim 1 to attaching of a metallic structural reinforcement on a leading edge of a turbomachine fan blade.

* * * * *